ns patents as United States Patent Office 3,515,547
Patented June 2, 1970

3,515,547
TRI LAYER PHOTOGRAPHIC FILM WITH A VESICULAR LAYER AND PROCESS
Norman Allentoff and Richard J. Rotondo, Rochester, N.Y., assignors to Eastman Kodak Company, Rochester, N.Y., a corporation of New Jersey
No Drawing. Filed Sept. 15, 1965, Ser. No. 487,626
Int. Cl. G03g 5/00; G03c 5/04, 1/52
U.S. Cl. 96—1                                    19 Claims

ABSTRACT OF THE DISCLOSURE

A light-sensitive photographic element comprising a transparent support having (1) an initially transparent layer of a thermoplastic resin having a low gas permeability and having dispersed therein a compound decomposible by exposure to ultraviolet light with the liberation of gas to cause, upon heating, the formation of myrid tiny vesicules in the said resin layer which are white and highly reflective and (2) a light-sensitive layer having as the light-sensitive material a photographic silver halide emulsion, an azido compound, an azonium compound, a light-sensitive polymer, etc., is used advantageously to make photographic copies by contact printing. After image exposure the latent image is developed to a visible image, fixed, exposed to ultraviolet light and immediately or simultaneously heated to form opaque vesicules.

---

This invention relates to photographic and other radiation-sensitive materials for document reproduction and in particular to such materials having supports which are initially transparent to facilitate exposure through the support and can be opacified and whitened in processing to provide good reflectance in the final copy.

Several procedures for making photographic copies by contact printing require the light pattern, which forms the latent image, to pass through the support of the photographic material. Accordingly, the photographic speed and the quality of the reproduction are increased as the transparency of the support is increased. The resulting copy, however, should present a highly reflective, white background. Therefore, a photographic material on a clear support which can be converted, during processing, to provide such a reflective, white background is required.

Some success has been achieved in this respect with so-called transparentizing treatments of paper support in which the normally opaque, white stock is rendered translucent by treating with glycols, glycol esters, soluble resins, and the like, to make them as transparent as possible. After exposure, the transparentizing material is removed with a solvent in the course of, or in addition to, the normal processing of the sensitive layer. However, the degree of transparency is frequently inadequate, the processing required to remove the transparentizing effect is cumbersome, and the resulting reflectivity is frequently not equal to that of ordinary paper support.

It is an object of this invention to provide a radiation-sensitive material suitable for use in contact printing operations in which the exposing radiation passes through the support of the sensitive material, said material having a layer which is highly transparent to the exposing radiation and capable of being whitened and opacified by a simple after-treatment without the need for processing baths.

It is another object of this invention to provide a process for reproducing documents comprising the steps of exposing a radiation-sensitive element having transparent support in an arrangement which requires that the exposing radiation pass through the support of the sensitive element before forming a latent image in the sensitive layer, developing and fixing the latent image and producing an opaque white, highly reflective background in the copy without wet treatment.

It is a further object to provide an image-forming, document-copying material which can be processed to yield either a final image on a highly transparent stable support or optionally on a white, highly reflective support.

It is a further object to provide a transparent support for coating of radiation-sensitive document-copying compositions, said support comprising a transparent layer which can be whitened and rendered opaque and highly reflective by simple physical treatment without wet processing.

It is a further object to provide a transparent opacifiable layer for use in whitening of document-copy elements during or after processing, and which is not necessarily attached to, or a part of, the support.

These and other objects, which will become apparent from the following description, are achieved by preparing a radiation-transmitting support which can be made white, highly reflective and highly opaque by successively or simultaneously exposing to ultraviolet light and briefly heating, and which can alternatively be made permanently and stably transparent by exposure to ultraviolet light and protecting from elevated temperatures for a short period. While the opacifiable layers of my invention will usually be coated on a transparent film base for added strength and dimensional stability, they can be used to advantage on translucent paper supports; e.g., glassine paper, to provide extra whiteness and reflectivity when desired in the final copy. They can also be coated in sufficient thicknesses to be used as self-supporting films. They can further be used over supports which are undesirably colored or may become colored or stained under conditions of processing or use.

In a preferred form of this invention, the transparent opacifiable layer, which we call a vesicular layer, comprises a thermoplastic binder containing a compound which upon exposure to ultraviolet light decomposes with the liberation of gas. Heat immediately after exposure results in expansion of the gas which causes the formation of myriad tiny vesicles, and consequently a highly reflective white appearance which provides the desired contrast with the overlying image areas. If the heating step is omitted or if a considerable period of time is allowed to elapse between exposure and heating, the liberated gas escapes from the layer, thus stabilizing it against opacification, producing a permanently transparent layer.

The sensitive copying materials employing the optionally opacifiable layers of this invention comprise (1) a support, which may be one of the usual transparent photographic film supports such as cellulose acetate, polycarbonates, poly(ethylene terephthalate), polystyrene, polypropylene, glass plates, and the like. Films having supports which are not transparent can sometimes be improved by an opacifiable layer between the support and the film-forming layer. For example, an antihalation dye undercoat on an opaque support such as aluminum foil can be masked or covered after it has served its antihalation function during exposure by means of a transparent layer under the image-forming layer that can be opacified after the photographic image is formed. (2) A sensitive layer for image formation, which usually will be a photographic silver halide emulsion but which might be another photosensitive material such as azido and azonium compounds, light-sensitive polymers and the like, and which may be a heat-sensitive image-forming transparent layer for use in a thermographic process or an image-forming layer sensitive to particular radiations such as infrared, gamma radiation, electron beam radiation, X-ray, and the like; and (3) the opacifiable layer which will be described in greater detail in subsequent sections of this specification.

Copying elements embodying the opacifiable layer of this invention may contain other layers, such as overcoatings, to improve abrasion resistance, subbing coats to improve adhesion, and the like.

Various arrangements of the component layers may be used, for example, the opacifiable layer can be coated on the opposite side of the transparent support from the radiation-sensitive element.

The opacifiable layer of our invention comprises a film-forming binder coated from a polymeric material of low vapor permeability in which is dispersed a compound which decomposes under ultraviolet irradiation to rapidly liberate gas. Upon heating, the expanding gas forms tiny bubbles or vesicles in the matrix which render it white and opaque. Suitable thermoplastic resins for use as the matrix material for the vesicular layer includes poly(vinyl chloride), copolymers of vinyl chloride and vinyl acetate, poly(vinylidene chloride), vinyl chloride-vinylidene chloride copolymers, copolymers of vinylidene chloride and acrylonitrile, poly(methyl methacrylate), copolymers of methyl methacrylate, polystyrene, poly(vinyl alcohol), poly(vinyl acetals), such as poly(vinylformal), poly(vinylacetal), and poly(vinyl butal), and copolymers of poly(vinyl alcohol) with poly(vinyl butal). The thermoplastic material of the opacifiable layer must have sufficiently low gas permeability so that the gas liberated by the decomposition of the decomposable compound will become entrapped in the thermoplastic matrix.

The decomposable compounds of our invention are preferably those which liberate nitrogen upon exposure to ultraviolet light. Especially suitable compounds for this purpose are various diazo and azido compounds.

Among the azido compounds which are suitable are 2-carbazido-1-naphthol, azidophthalic anhydride, ethylene bis(4-azidobenzoate), 4-azido-$\beta$-nitrostyrene, 4-azidoacetophenone, and 2-(4-azidocinnamoyl)thiophene.

Examples of diazo compounds which may be used according to this invention are N,N-dimethylaniline-4-diazonium chloride-zinc chloride double salt, p-diazodiphenylamine sulfate, p-diazo-N-ethyl - N - hydroxyethylaniline chloridezinc chloride, p-diazo-N-ethyl-N-methylaniline chloride-zinc chloride, 1-diazo-2-oxynaphthalene-4-sulfonate, p-diethylaminobenzenediazonium chloride-zinc chloride, 4-benzoylamino - 2,5 - diethoxybenzenediazonium chloride, p - chlorobenzenesulfonate of 4 - diazo-N - cyclohexylaniline, p - chlorobenzenesulfonate of 4-diazo - 2 - methoxy - 1 - cyclohexylaminobenzene, tin chloride double salt of 4 - (N - methylcyclohexylamino)benzenediazonium chloride, p - acetamidobenzenediazonium chloride, 4 - dimethylaminobenzenediazonium chloride, 4 - (N - morpholino)benzenediazonium chloride, 4 - (N - piperidyl) - 2,5 - diethoxybenzenediazonium chloride, 1-dimethylaminonaphthalene-4-diazonium chloride, and 4-phenylaminobenzenediazonium chloride. It is understood, of course, that other gas-releasing compounds may be used to produce vesiculation of a transparent coating in lieu of the compounds mentioned above, provided such compounds are compatible with the other components of which the element is comprised.

Adhesion of the image-forming layer to the opacifiable layer can be improved by the use of a suitable subbing coat such as a copolymer of methyl acrylate, acrylic acid and vinylidene chloride and gelatin or other subbing compositions compatible with the layers that they are coated between.

To produce copies with an element of this invention, an original to be copied is placed with its printed face against the back side of the element, i.e., the side opposite the radiation-sensitive layer, and the element is exposed, so that the light passes through the sensitive layer and the support to the original and reflects back to the sensitive layer to form a latent image in the sensitive layer. Alternatively, the element can be exposed so that the light passes through the original and the support to the sensitive layer. The resulting latent image, which has the same left to right sense as the original, is developed and fixed by a conventional process consistent with the type of sensitive layer used and the type of image (positive or negative) desired. The resulting image-bearing element is then exposed to radiation from an ordinary ultraviolet lamp and is immediately or simultaneously heated to a temperature of 50° C. to 100° C. for a short time, usually in the order of 5 to 30 seconds, to cause decomposition of the decomposable compound in the vesicular layer and expansion of the liberated gas to form vesicles with consequent whitening and opacification of the entire layer. This whitening provides a background of good contrast for the dark image so that the copy may be easily read.

The invention will now be described further with respect to specific embodiments as illustrated in the following examples.

EXAMPLE I

A vesicular coating composition is coated on a poly (ethylene terephthalate) ("Mylar") support at a dry coating coverage of 1.4 g. to 2 g./ft.$^2$. The coating composition is as follows:

| | G. |
|---|---|
| Vinylidene chloride-acrylonitrile copolymer | 189 |
| Poly(methyl methacrylate) | 21 |
| 2-carbazido-1-naphthol | 16–21 |
| Acetone | 560–580 |

An adhesive subcoating composition is then applied to the vesicular layer at a coating coverage of 200 mg./ft.$^2$ dry weight. The subcoating composition is as follows:

| | G. |
|---|---|
| Copolymer of acrylic acid, methyl acrylate, vinylidene chloride and gelatin | 50 |
| Saponin | 1.53 |

Water to make 1 liter.

The copolymer was made from 8 parts by weight of acrylic acid, 9.2 of vinylidene chloride, 82.8 of methyl acrylate and 25 of gelatin.

A medium speed, negative silver-bromoiodide emulsion is coated on the subcoating layer in the usual manner. This emulsion contains 762 mg./ft.$^2$ of Ag and 840 mg./ft.$^2$ of gelatin.

The photographic emulsion is exposed through the support to light transmitted from the source directly through an original, which is placed with its printed face against the support layer for one minute on a Kodak Model 60 Control Sensitometer. The exposed element is developed for 5 minutes in a developer having the following composition:

Water (50° C.)—500 cc.
p-Methylaminophenol—2.5 g.
Sodium sulfite—30 g.
Hydroquinone—2.5 g.
Potassium metaborate—10.0 g.
Potassium bromide—0.5 g.
Water to make 1 liter.

The developed image is fixed, washed and dried in the usual manner, giving a negative image on the transparent support. The element is then exposed for 10 seconds, through the support to ultraviolet radiation having an intensity of 40 foot-candles from a Black Light lamp having a peak at 365 millimicrons. The element is then heated for 15 seconds at 90° C. This causes whitening of the vesicular layer to provide an opaque white background of good contrast for the negative image, viewed from the emulsion side.

EXAMPLE II

A transparent vesicular coating of the same composition as in Example I is coated on a translucent polyethylene impregnated map overlay paper support at a dry coating coverage of 1.4 to 2 g./ft.$^2$. After the vesicular coating has dried, a subcoating is applied at a dry coating coverage of 200 mg./ft.$^2$. The composition of the subcoating is as follows:

|  | G. |
|---|---|
| Copolymer of acrylic acid, methyl acrylate, vinylidene chloride and gelatin | 50 |
| "Ludox AM" (a 30% dispersion of colloidal silica) | 10 |
| "Triton X–200" (an anionic polyethylene glycol surfactant) | 1.3 |
| Polyglyoxal | 0.25 |
| Acetone | 50 |

Water to make 1 liter.

On the subcoating composition a fine-grain gelatin-silver chloride direct reversal positive emulsion is applied at a coverage of 309 mg./ft.$^2$ of gelatin. This emulsion is coated by conventional technique. A sample of this coated element is exposed to light from a source passing through the translucent paper support and reflected from the printed face of a line drawing on a white bond paper which is placed next to the support side of the element. A one-minute exposure to a tungsten light source in a Verifax Copier is used.

The coating is developed for 30 seconds in Kodak D–72 Developer, diluted one part stock solution with one part water. See Lange's Handbook of Chemistry, 8th Edition, 1952, Handbook Publishers, Inc., page 1800.

The photographic emulsion is then fixed and dried, giving a right reading positive image of the line drawing. After fixation of the photographic image, the element is exposed to ultraviolet light and heated as described in Example I giving a right reading copy of the line drawing on a white background affording good contrast.

EXAMPLE III

A photoconductive composition is prepared by agitating 0.5 g. of 4′,4″-bis(diethylamino)-2,6-dichloro-2′,2″-dimethyltriphenylmethane, 0.025 g. of 4-(4-n-amyloxyphenyl) - 2,6-bis(4-ethylphenyl)thiapyrylium perchlorate, 15 ml. of tetrahydrofuran and 2 g. of Vitel, a copolyester of poly(ethylene terephthalate), sold by Goodyear Tire and Rubber Company, until a clear viscous solution results. This solution is coated on a poly(ethylene terephthalate) support over a conductive layer consisting of the sodium salt of a carboxy-ester lactone prepared by the reaction of glycolic acid, n-butanol and an interpolymer of vinyl acetate and maleic anhydride, as described in U.S. patent application Ser. No. 201,808 filed June 12, 1962 by Minsk and Sterman now U.S. Patent 3,206,312. A vesicular dope as described in Example I above is hand-coated with a coating knife to a wet thickness of 0.005-inch on the reverse side of the support.

The resulting electrophotographic element is charged by means of a negative corona and then placed upon an original to be copied with the opacifiable layer in contact with the face of the original. The element is exposed to light from a 300 watt tungsten lamp at 13 inches for 12 seconds such that the light passes through the sensitive layer and the support and reflects from the original back through the support and the sensitive layer. The element is toned with xerographic toner particles having positive triboelectric charge and fixed by heating.

The reverse side of the element, i.e., the side containing the opacifiable layer, is then exposed to ultraviolet light for 15 seconds (40 foot-candles of radiation from a Black Light lamp having a peak at 365 millimicrons) and heated at 90° C. for 15 seconds to expand the gas released in the opacifiable layer causing opacification of the background areas. A positive, right-reading image on a white background results.

EXAMPLE IV

A light-sensitive, two-component diazo composition as described in Example I of U.S. Pat. No. 2,418,623 is coated on a transparent poly(ethylene terephthalate) support. A vesicular composition as described in Example I above is then coated on the reverse side of the support. The resulting photographic element is placed on an original with the opacifiable layer in contact with the front of the original and exposed so that the light passes from the source, through the original, the vesicular layer, the support and into the sensitive layer, for ten seconds to ultraviolet light having an intensity of 40 foot-candles from a Black Light lamp having a peak at 365 millimicrons. The element is then heated for at least 15 seconds with steam which causes the unexposed, undecomposed diazo material in the sensitive layer to couple with a coupler compound in the image-forming layer forming a positive image in the nonexposed areas, and also causes the liberated gas entrapped in the vesicular layer to expand causing opacification in exposed areas of the vesicular layer. A blue dye positive image having good contrast with the highly reflective vesicular background results.

It will be understood that modifications and variations may be made within the scope of the invention as described above and as defined in the following claims.

What we claim is:

1. A copy element comprising (1) a transparent support having coated thereon (2) an initially transparent layer of a thermoplastic resin having low gas permeability and having dispersed therein a compound decomposable by exposure to ultraviolet light with the liberation of gas to cause, upon heating, expansion of the liberated gas and consequent vesicular whitening of said transparent layer and (3) a photosensitive layer for image formation selected from the class consisting of a photographic hydrophilic colloid silver halide emulsion layer and a photoconductive layer, such that when said photosensitive layer is a photoconductive layer, a conductive layer consisting of an alkali metal salt of a carboxy-ester lactone is coated between said transparent support and said photoconductive layer and said initially transparent layer is coated on the other side of said transparent support.

2. A photographic film comprising (1) a transparent support having coated thereon (2) an initially transparent layer of low gas permeability thermoplastic resin containing a compound which is decomposable with the liberation of gas to cause, upon heating promptly after exposure to light, vesicular opacification of said transparent layer, and (3) a photographic hyprophilic colloid silver halide emulsion layer.

3. A process for making duplicate copies on a sensitive element, said element comprising (1) a radiation-transmitting support layer having coated thereon (2) a transparent thermoplastic resin layer of low gas permeability containing a compound which is decomposable by photoexposure with the liberation of gas that causes vesicular opacification of said thermoplastic layer when heated after photoexposure, and (3) a radiation-sensitive image-forming layer selected from the class consisting of a photographic hydrophilic colloid silver halide emulsion layer and a photoconductive layer such that when photosensitive layer is a photoconductive layer, a conductive layer consisting of an alkali metal salt of a carboxy-ester lactone is coated between the transparent support and said photoconductive layer and said initially transparent layer is coated on the other side of said support, said process comprising the steps of exposing said image forming layer to imagewise radiation, processing to produce a visible image in said image forming layer, exposing said transparent thermoplastc resin layer to light from the side of said element farthest from said visible image causing decomposition of said decomposable compound to liberate gas and heating to cause vesicular opacification of said thermoplastic layer by the liberated gas whereby a print comprising said visible image and an opaque backing therefore is formed such that when said radiation-sensitive image-forming layer is a photoconductive layer, the image exposing step is preceded by a step in which said photoconductive layer is charged by means of a negative corona and processing to produce a visible image in said photoconductive layer after exposure to imagewise radiation comprises toning a photoconductive image on said photoconductive layer with xerographic toner particles having positive triboelectric charge and fixing by heating, and such that when said radiation-sensitive image-forming layer is said silver halide emulsion layer, processing to produce a visible image after exposure to magewise radiation comprises treatment with an aqueous alkaline silver halide developer, washing and fixing.

4. A process according to claim 1 in which said element after processing is exposed to ultraviolet light.

5. A process according to claim 4 in which said element is immediately heated after exposure to said ultraviolet light.

6. An element according to claim 1 in which said compound is decomposable with the liberation of nitrogen.

7. An element according to claim 1 in which said compound is selected from the group consisting of diazo and azido compounds which are decomposable by the action of ultraviolet light with the liberation of nitrogen.

8. An element according to claim 1 in which said compound is 2-carbazido-1-naphthol.

9. A photographic film according to claim 2 where said compound decomposes by ultraviolet light to liberate gas.

10. A photographic film according to claim 2 in which said compound is decomposable with the liberation of nitrogen.

11. A photographic film according to claim 2 in which said compound is selected from the group consisting of diazo and azido compounds which are decomposable by the action of ultraviolet light with the liberation of nitrogen.

12. A photographic film according to claim 2 in which said decomposable compound is 2-carbazido-1-naphthol.

13. A photographic film according to claim 2 in which said transparent vesicular layer is between said support and said photographic layer.

14. A photographic film according to claim 2 in which said transparent vesicular layer is on the reverse side of the support from the said photographic layer.

15. A photographic film according to claim 2 in which said light-sensitive layer is a negative silver halide photographic emulsion.

16. A photographic film according to claim 2 in which said light-sensitive layer is a direct positive silver halide emulsion.

17. A process for making photographic copies in a film comprising a light-transmitting support layer, a photosensitive silver halide emulsion layer, and a transparent thermoplastic resin layer of low gas permeability containing a compound which is decomposable with the liberation of gas that causes vesicular opacification of said thermoplastic layer, which comprises the steps of exposing said emulsion to actinic radiation, processing said exposed emulsion to produce a silver record and exposing said film to conditions causing decomposition of said decomposable compound to liberate gas with resultant vesicular opacification of said thermoplastic layer, whereby a photographic print comprising an image and an opaque backing therefor is formed.

18. A process according to claim 17 in which said film after developing and fixing is exposed to ultraviolet light.

19. A process according to claim 18 in which said film is heated immediately after exposure to said ultraviolet light.

References Cited
UNITED STATES PATENTS

| | | | |
|---|---|---|---|
| 2,908,571 | 10/1959 | Roman | 96—47 |
| 3,194,660 | 7/1965 | Lahr | 96—47 |
| 3,223,526 | 12/1965 | Grieshaber et al. | 96—49 X |
| 3,215,529 | 11/1965 | Lindquist et al. | 96—75 |

NORMAN G. TORCHIN, Primary Examiner

E. KIMLIN, Assistant Examiner

U.S. Cl. X.R.

96—1.5, 27, 47, 49, 68, 75

PO-1050
(5/69)

UNITED STATES PATENT OFFICE
CERTIFICATE OF CORRECTION

Patent No. 3,515,547      Dated June 2, 1970
U.S.N. 487,626
Inventor(s) Norman Allentoff and Richard J. Rotondo It is certified that error appears in the above-identified patent and that said Letters Patent are hereby corrected as shown below:

Column 6, line 28, between "A" and "element", delete "copy" and insert in its place --copying--. Column 7, line 14, between "to" and "radiation", delete "magewise" and insert in its place --imagewise--.

SIGNED AND
SEALED
OCT 13 1970

(SEAL)
Attest:

Edward M. Fletcher, Jr.
Attesting Officer

WILLIAM E. SCHUYLER, JR.
Commissioner of Patents